Dec. 16, 1941.  E. H. LUTZ  2,266,679
LIQUID CONGEALING APPARATUS
Filed Sept. 21, 1937
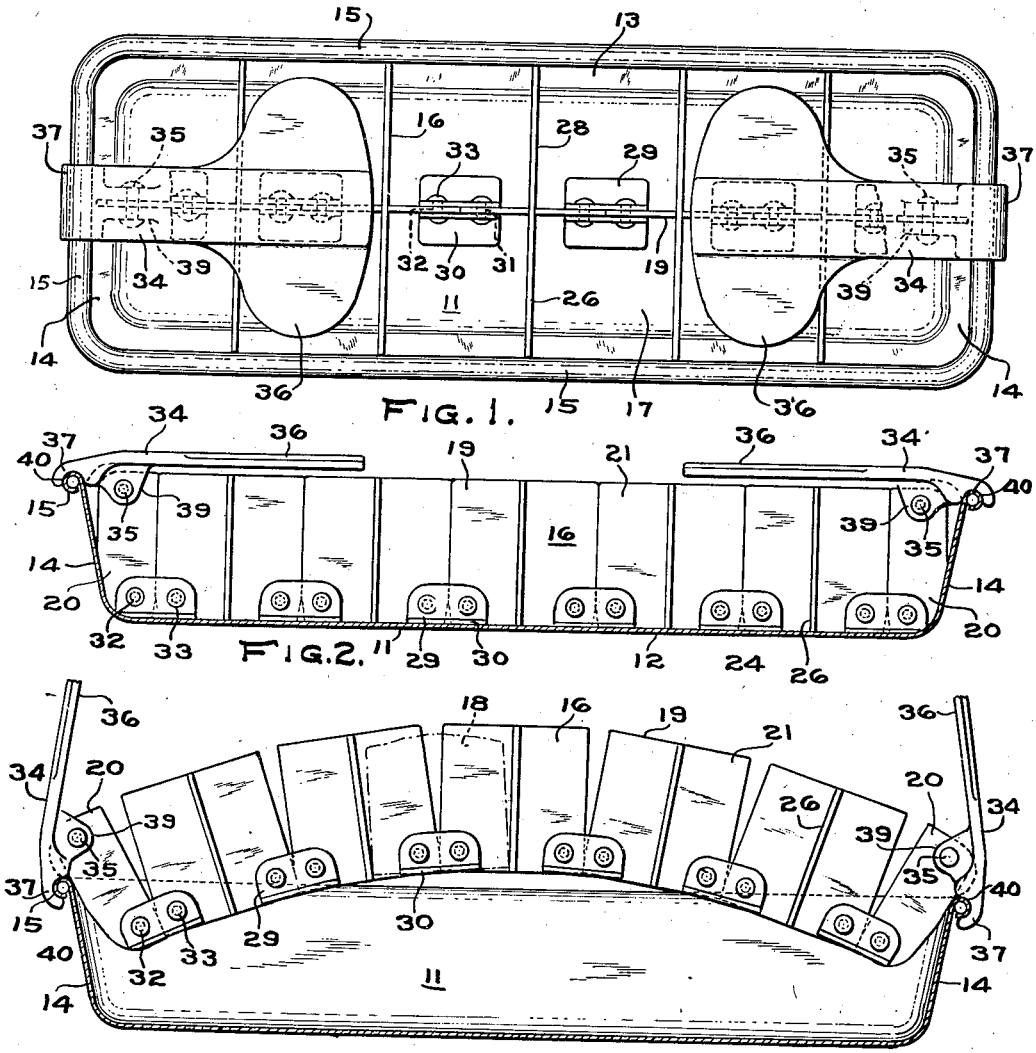
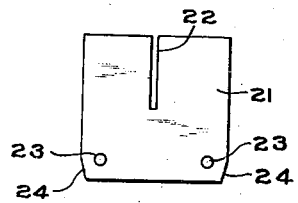
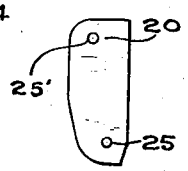
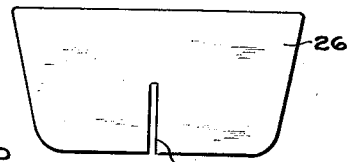
WITNESSES:
Margaret G. Crego
Marie V. Duffy
INVENTOR
EDWARD H. LUTZ.
BY
ATTORNEY Patented Dec. 16, 1941

2,266,679

UNITED STATES PATENT OFFICE 2,266,679

LIQUID CONGEALING APPARATUS

Edward H. Lutz, Norwood, Pa., assignor to Westinghouse Electric & Manufacturing Company, East Pittsburgh, Pa., a corporation of Pennsylvania Application September 21, 1937, Serial No. 164,841

8 Claims. (Cl. 62—108.5)

My invention relates to liquid congealing apparatus, and particularly to an ice pan and grid structure for forming pieces of ice of a size suitable for domestic and table use.

It is an object of my invention to effect easy removal of ice from an ice pan and grid structure by mechanical force as contrasted with the use of heat.

It is another object of my invention to provide a novel leverage system for raising a grid structure having relatively movable parts from an ice pan, and for moving the movable grid parts to release the ice therefrom.

It is still another object of my invention to provide a novel ice pan and grid structure from which ice cubes are mechanically raised and released and maintained in raised position so that they are readily removable from the ice pan and grid structure.

It is a further object of my invention to provide a novel leverage system for use with an ice pan and grid structure having relatively movable parts, so that the ice pan serves as the force resisting member for the leverage system when operated to impart movement to the movable parts of the grid structure.

These and other objects are effected by my invention as will be apparent from the following description and claims taken in connection with the accompanying drawing, forming a part of this application, in which:

Fig. 1 is a top plan view of an ice pan and grid structure illustrating my invention;

Fig. 2 is a side elevational view of the ice pan and grid structure shown in Fig. 1, with parts of the ice pan broken away;

Fig. 3 is a view similar to that shown in Fig. 2 with the grid structure in a raised position for breaking the bond between the ice cubes and the ice pan and grid structure;

Fig. 4 is a detail view of an intermediate longitudinal grid wall member;

Fig. 5 is a detail view of a transverse grid wall member; and

Fig. 6 is a detail view of an end longitudinal grid wall member.

Referring specifically to the drawing for a detailed description of my invention, numeral 11 designates a relatively shallow open topped metallic ice pan, preferably formed of aluminum or aluminum alloy having a bottom wall 12, side walls 13, and end walls 14. A reinforcing lip 15, formed by rolling over the metal of the ice pan 11, is provided at the upper edge of the side walls 13 and end walls 14.

A removable grid structure, generally indicated at 16, is normally disposed in the ice pan 11 and divides the ice pan into a plurality of cells 17 for forming ice cubes 18 of a size suitable for domestic or table use. The grid structure 16 is shown in a preferred form, but it will be obvious hereinafter that my invention is not limited thereto.

The grid structure 16 embodies a longitudinal vertically disposed wall 19, which is formed of a plurality of intermediate longitudinal wall members 21, as shown in detail in Fig. 4, and two end longitudinal wall members 20, as shown in detail in Fig. 6. Both the wall members 20 and 21 are preferably formed of relatively rigid pieces of stamped aluminum or aluminum alloy. The intermediate longitudinal wall members 21 are provided with a slot 22 in the middle thereof extending downwardly about half way from the top. An aperture 23 is provided adjacent each bottom corner of the intermediate longitudinal wall members 21, and each wall member 21 is cut on an inward bias at the bottom corner, as shown at 24. Each end longitudinal wall member 20 is provided with an aperture 25 at its inner bottom corner and with an aperture 25' at its upper outer corner.

The grid structure 16 is assembled by first attaching a transverse wall member 26 to each of the intermediate longitudinal wall members 21, which transverse wall members are also preferably formed of rigid stamped aluminum or aluminum alloy. Each transverse wall member 26 is provided with a slot 27 in the middle thereof extending upwardly about half way from the bottom. The slots 22 in the longitudinal wall members 21 receive the transverse wall members 26 and the slots 27 in the transverse wall members 26 receive the longitudinal wall members 21, thus locking the longitudinal and transverse wall members together into a unitary grid member 28 of cruciform shape, as best shown in Fig. 1. The cruciform grid members 28 are then hingedly connected together by attaching L-shaped connectors 29 to the longitudinal wall members 20 and 21. The connectors 29 have apertures 31 therein which register with adjacent apertures 23 in contiguous intermediate longitudinal wall sections 21. Hinge pins 32 pass through the apertures 23 and 31 and are provided with heads 33, thus retaining the cruciform grid members 28 in hinged relation so that they are movable relative to each other. The end longitudinal wall members 20 are also attached by connectors 29 and hinge pins 31, as clearly shown in Fig. 2. The outwardly projecting portions of the L-shaped connectors 29, designated by numeral 30, project into the cells 17, as shown in Fig. 1.

Leverage members 34 are then pivotally attached to the end longitudinal wall members 20 by pivot pins 35 which extend through the apertures 25' in the upper corners of the end longitudinal wall members 20. The leverage members 34 each embody a handle portion 36 at the end thereof and a bearing portion 37 at the other end, rounded as shown in Figs. 2 and 3 to engage the rounded reinforcing lip 15. The bearing 37 and reinforcing lip 15 form a pivoted joint indicated by the numeral 40. The leverage member also embodies a lip 39 to which the pivot pins 35 are attached, the pins 35 being positioned slightly below the pivoted joint 40 when the grid structure 16 is in its normal position in the ice pan 11, as shown in Fig. 2.

Operation

In order to remove the ice cubes 18 from the ice pan and grid member after the ice cubes have been frozen therein, the handles 36 of the leverage members 34 are grasped and rotated outwardly as shown in Fig. 3, the pivoted joints 40 between the leverage members 34 and the reinforcing lip 15 severing as fulcrums for the leverage members. Very slight movement of the handles 36 from the position shown in Fig. 2 raises the entire grid member 16 from the ice pan 11 without imparting relative movement to the cruciform members 28 of the grid member. This operation is effected because the pivoted connection 35 between the leverage members 34 and the end longitudinal members 20 starts to move from a position slightly below the pivoted joint 40 when the handles 36 are rotated, so that movement of the pivoted connection 35 at first is substantially in a straight vertical line, and the grid member 16 is, therefore, lifted upwardly by movement of the leverage members 34, which movement is transmitted to the grid member 16 through the pivoted connection 35. The bond between the ice cubes 18 and the ice pan 11 is thereby broken, the outwardly projecting portions 30 of the L-shaped connectors 29 assisting in lifting the ice cubes which still adhere to the grid member 16. The grid member 16 is stiff in a direction upwardly of the ends thereof during the first slight movement of the handles 36 because the contiguous edges of the longitudinal wall members 20 and 21 bear against each other when force is applied to the leverage members 34 to lift the grid member 16, and since the longitudinal wall members are hinged at their bottoms by the rigid connectors 29.

Further rotational movement of the handles 36 to the position shown in Fig. 3 arches the grid member 16 upwardly. Such movement is effected because the pivoted connections 35 between the leverage members 34 and the end longitudinal wall members 20 rotate outwardly in an arc about the pivotal joint 40 between the leverage members 34 and the reinforcing lip 15 and because the rounded bearing portion 37 of the leverage means 34 engages with the reinforcing lip 15 and prevents outward movement of the leverage members 34 relative to the ice pan 11. Force is thereby applied by the leverage means 34 inwardly against the ends walls 14 of the ice pan 11 and outwardly of the ends of the grid member 16 tending to stretch the grid member 16 in a longitudinal direction. These forces move each cruciform grid member 28 about the pivot pins 32 so that the tops of the longitudinal wall members 20 and 21 separate and the grid is arched. The relative movement thus imparted to the movable portions of the grid member 16 breaks the bond between the ice cubes 18 and the grid member so that the ice cubes may be readily removed therefrom. The outwardly extending projections 30 of the L-shaped connectors 29 lift the ice cubes 18 and retain them in a raised readily accessible position as long as the grid member 16 is arched. The upward arching movement of the grid member 16 is preferably limited by the biased edges 24 of the longitudinal wall members 21 engaging with each other, as shown in Fig. 3.

The ice pan 11 and grid member 16 are preferably anodically treated and then subjected to a wax treatment to facilitate removal of ice cubes from the apparatus. Such a process for wax treatment of anodically coated ice pans and grids is fully described and claimed in a copending application of W. B. Anderson, Serial No. 73,436, filed April 9, 1936, for Process of treating liquid congealing apparatus and assigned to the assignee of the present application.

From the foregoing, it will be apparent that I have provided an improved ice pan and grid structure for effecting the mechanical ejection of ice cubes in which the ice cubes are readily released from the apparatus and are retained in a readily accessible position.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In liquid congealing apparatus, the combination of an open topped ice pan embodying bottom, side and end walls, a removable longitudinally-extending grid structure for dividing the ice pan into a plurality of ice-cube forming cells, said grid structure including a longitudinal wall member formed of a plurality of rigid pieces of metal hinged together at the bottom thereof and transverse wall members attached to at least some of said rigid pieces of metal, some of said wall members being movable relative to each other, leverage means engageable with the end walls of said ice pan and means for rotatably attaching the leverage means to each longitudinal end of the grid structure, said end walls serving as fulcrum points for the leverage means when the leverage means are operated to engage the end walls to raise the grid structure from the ice pan and thereby break the bond between the ice cubes and the ice pan, said leverage means engaging the end walls of the ice pan upon further operation in such a manner that the distance between said attaching means is increased and the grid structure arches upwardly, thereby moving the grid walls to break the ice bond between the grid structure and the ice cubes.

2. In liquid congealing apparatus, the combination of an open topped ice pan embodying bottom, side and end walls, a removable longitudinally-extending grid structure for dividing the ice pan into a plurality of ice-cube forming cells, said grid structure including a longitudinal wall member formed of a plurality of rigid pieces of metal hinged together at the bottom thereof and transverse wall members attached to at least some of said rigid pieces of metal, some of said wall members being movable relative to each other, leverage means engageable with the end walls of said ice pan, means for rotatably attaching a leverage means to each longitudinal end of the grid structure, said end walls serving as fulcrum points for the leverage means when the leverage means are operated to raise the grid structure from the ice pan to break the bond between the ice cubes and the ice pan, said leverage means engaging the end walls of the ice pan upon further rotation in such a manner that the distance between said attaching means is increased and the grid structure arches upwardly, thereby moving the grid walls to break the ice bond between the grid structure and the ice cubes and means for limiting the upward arching movement of the grid structure.

3. In liquid congealing apparatus, the combination of an open topped ice pan embodying bottom, side and end walls, a removable longitudinally-extending grid structure for dividing the ice pan into a plurality of ice-cube forming cells, said grid structure including a longitudinal wall member formed of a plurality of rigid pieces of metal hinged together at the bottom thereof and transverse wall members attached to at least some of said rigid pieces of metal, some of said wall members being movable relative to each other, leverage means engageable with the end walls of said ice pan, means for rotatably attaching a leverage means to each longitudinal end of the grid structure, said end walls serving as fulcrum points for the leverage means when the leverage means are operated to raise the grid structure from the ice pan to break the bond between the ice cubes and the ice pan, said leverage means engaging the end walls of the ice pan upon further rotation in such a manner that the distance between said attaching means is increased and the grid structure arches upwardly, thereby moving the grid walls to break the ice bond between the grid structure and the ice cubes, and means on the grid structure for lifting and retaining the ice cubes in lifted position when said grid structure is arched.

4. In liquid congealing apparatus, the combination of an ice pan embodying bottom, side, and end walls, a removable grid structure for dividing the ice pan into a plurality of ice cube forming cells, said grid structure embodying a longitudinal wall member and a plurality of inflexible transverse wall members associated therewith, at least some of said wall members being movable relative to each other, and leverage means pivotally attached adjacent the upper ends of the longitudinal wall member and engageable with the end walls of the ice pan, which end walls first serve as fulcrum points for said leverage means when said leverage means is operated to engage said end walls to raise the grid structure from the ice pan and thereby break the bond between the ice cubes and the ice pan, said leverage means upon further operation and while engaging the end walls of the ice pan being adapted to rotate the ends of the longitudinal wall member in opposite directions through said pivotal attachments to move said relatively movable grid walls and break the bond between the ice cubes and the grid structure.

5. In liquid congealing apparatus, the combination of an ice pan embodying bottom, side, and end walls, a removable grid structure for dividing the ice pan into a plurality of ice cube forming cells, said grid structure embodying a longitudinal wall member and a plurality of inflexible transverse wall members associated therewith, at least some of said wall members being movable relative to each other, and leverage means pivotally attached adjacent the upper ends of the longitudinal wall member and engageable with the end walls of the ice pan, which end walls first serve as fulcrum points for said leverage means when said leverage means is operated to engage said end walls to raise the grid structure from the ice pan and thereby break the bond between the ice cubes and the ice pan, said leverage means upon further operation and while engaging the end walls of the ice pan being adapted to rotate the ends of the longitudinal wall member in opposite directions through said pivotal attachments to move said relatively movable walls and break the bond between the ice cubes and the grid structure, and said end walls of the ice pan and the portions of the leverage means engaging therewith being formed to prevent substantial longitudinal movement of the leverage means relative to the ice pan during operation.

6. In liquid congealing apparatus, the combination of an ice pan embodying bottom, side, and end walls, a removable grid structure for dividing the ice pan into a plurality of ice cube forming cells, said grid structure embodying a longitudinal wall member and a plurality of inflexible transverse wall members associated therewith, at least some of said wall members being movable relative to each other, and leverage means pivotally attached adjacent the upper ends of the longitudinal wall member and engageable with the end walls of the ice pan, which end walls first serve as fulcrum points for said leverage means when said leverage means is operated to engage said end walls to raise the grid structure from the ice pan and thereby break the bond between the ice cubes and the ice pan, said leverage means upon further operation and while engaging the end walls of the ice pan being adapted to rotate the ends of the longitudinal wall member in opposite directions through said pivotal attachments to move said relatively movable walls and break the bond between the ice cubes and the grid structure, said end walls of the ice pan embodying a rounded reinforcing lip at their upper edge and said reinforcing lip and said leverage means engaging in such manner that longitudinal movement of the leverage means relative to the ice pan is substantially prevented during operation.

7. In liquid congealing apparatus, the combination of an ice pan embodying bottom, side, and end walls, a removable grid structure for dividing the ice pan into a plurality of ice cube forming cells, said grid structure embodying a longitudinal wall member and a plurality of inflexible transverse wall members associated therewith, at least some of said wall members being movable relative to each other, and leverage means pivotally attached adjacent the upper ends of the longitudinal wall member and engageable with the end walls of the ice pan, which end walls first serve as fulcrum points for said leverage means when said leverage means is operated to engage said end walls to raise the grid structure from the ice pan and thereby break the bond between the ice cubes and the ice pan, said leverage means upon further operation and while engaging the end walls of the ice pan being adapted to rotate the ends of the longitudinal wall member in opposite directions through said pivotal attachments to move said relatively movable walls and break the bond between the ice cubes and the grid structure, said end walls of the ice pan and said leverage means engaging with each other to provide fixed pivots about which the pivotal attachments between the leverage means and the grid structure rotate.

8. In liquid congealing apparatus, the combination of an ice pan, a removable grid structure having relatively movable parts disposed in the ice pan for dividing the same into a plurality of ice cube forming cells, means for raising the grid structure from the ice pan and means for imparting movement to said movable parts of the grid structure to break the bond between the ice cubes and the grid structure, said grid structure comprising a plurality of longitudinal wall members, a plurality of transverse wall members rigidly attached to said longitudinal wall members to form cruciform shaped grid units, and means for hingedly connecting said longitudinal wall members together at their bottoms, said connecting means including rigid projections extending into said cells near the bottoms thereof to lift the ice cubes when said grid structure is raised and to retain the ice cubes in lifted position when said grid parts are moved to break the ice bond between the grid structure and the ice cubes.

EDWARD H. LUTZ.